United States Patent
Diskin et al.

(10) Patent No.: US 9,986,717 B1
(45) Date of Patent: Jun. 5, 2018

(54) PET BED

(71) Applicant: Worldwise, Inc, San Rafael, CA (US)

(72) Inventors: Aimee Diskin, Napa, CA (US);
Hannah Rosenberg, San Francisco, CA (US); Regina Chern, Danville, CA (US); Sara Paculdo, Novato, CA (US)

(73) Assignee: Worldwise, Inc., Novato, CA (US)

( * ) Notice: Subject to any disclaimer, the term of this patent is extended or adjusted under 35 U.S.C. 154(b) by 615 days.

(21) Appl. No.: 14/299,498

(22) Filed: Jun. 9, 2014

Related U.S. Application Data

(63) Continuation-in-part of application No. 14/249,790, filed on Apr. 10, 2014.

(51) Int. Cl.
*A01K 1/00* (2006.01)
*A01K 1/035* (2006.01)

(52) U.S. Cl.
CPC .................. *A01K 1/0353* (2013.01)

(58) Field of Classification Search
CPC .............................. A01K 1/0353; A01K 1/035
USPC ....................................................... 119/28.5
See application file for complete search history.

(56) References Cited

U.S. PATENT DOCUMENTS

| | | | | |
|---|---|---|---|---|
| 4,184,237 A | * | 1/1980 | Blankenship | B68G 1/00 29/451 |
| 6,237,531 B1 | * | 5/2001 | Peeples | A01K 1/0353 119/28.5 |
| 7,530,326 B2 | * | 5/2009 | Dunn | A01K 1/0353 119/169 |
| 2006/0060147 A1 | * | 3/2006 | Appelhans | A01K 1/0353 119/28.5 |
| 2008/0216752 A1 | * | 9/2008 | Song | A01K 1/0353 119/28.5 |
| 2013/0167776 A1 | * | 7/2013 | Schiel | A01K 1/0353 119/28.5 |
| 2014/0230735 A1 | * | 8/2014 | Coulter | A01K 1/0353 119/28.5 |
| 2014/0261190 A1 | * | 9/2014 | Landers | A01K 1/0353 119/28.5 |

* cited by examiner

*Primary Examiner* — Monica L Williams
*Assistant Examiner* — Aaron Rodziwicz
(74) *Attorney, Agent, or Firm* — Bay Area Technology Law Group PC

(57) ABSTRACT

A pet bed having a substructure including a square or rectangular-shaped planar base and four sidewalls extending orthogonally from it. The sidewalls are affixed to the planar base proximate its edges and to each other to establish a volume. The substructure is introduced to an outer shell fabric, said outer shell fabric having a top cover selectively joined thereto for providing selective access to the volume. A cushion is shaped and sized for snugly fitting within the volume and being frictionally retained therein, the top cover providing for selective access thereto.

4 Claims, 3 Drawing Sheets

PET BED

RELATED APPLICATIONS

The present application is a Continuation-In-Part of U.S. application Ser. No. 14/249,790, filed on Apr. 10, 2014.

TECHNICAL FIELD

The present invention involves a bedding product which is ideally suited for use as a pet bed. The bed includes a foam substructure creating a tailored volume for receipt of a square or rectangular cushion frictionally retained therein.

BACKGROUND OF THE INVENTION

Pet beds are in common use as pet owners desire to provide comfortable surfaces to enable a pet to relax and sleep. When a bed is not provided, pets will generally sleep on hard floors and, in some instances, furniture, the former having potentially adverse consequences particularly for pets that are older and arthritic although the latter can result in staining which anyone owning fine furniture would like to avoid.

Most pet beds are in the form of shell material having cushioning fill contained therein. Such beds fail to have a tailored look and are oftentimes suggestive of a "bean bag" or like structure. Those pet beds which are structured, establish their look through the use of subparts which are not conducive to an animal's safety and wellbeing. Hard or rigid structural components can extend through the beds' outer shell material which could prove harmful. Other products which may seem tailored or structured when first introduced to a pet eventually lose their shape as the pet lounges on the product and the bed's substructure breaks down.

It is thus an objective of the present invention to provide a structured pet bed which is not only safe but which will not lose its tailored look over time.

It is yet a further objective of the present invention is to provide a pet bed with a cushion integrally sewn to an outer shell fabric, thus resulting in a lower cost of fabrication and an enhanced sought-after tailored look.

These and further objects will be readily apparent when considering the following disclosure and appended claims.

SUMMARY OF THE INVENTION

A pet bed having a substructure including a square or rectangularly shaped planar base and four sidewalls extending orthogonally from it. The sidewalls are affixed to the planar base proximate its edges and to each other establishing a volume. A substantially square or rectangular cushion is provided having a liner for defining its shape and size and cushioning fill material contained therein. The cushion is shaped and sized for snuggly fitting within the volume and being frictionally retained within it.

DETAILED DESCRIPTION OF THE INVENTION

Figure 1:
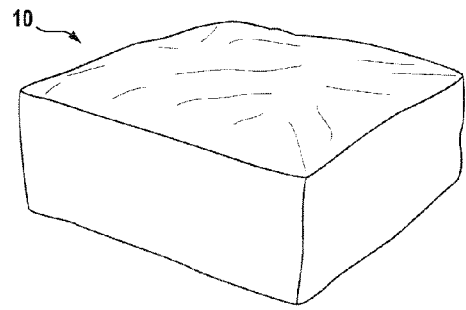
FIG. 1 is a perspective view of a cushion as part of the pet bed of the present invention.
Figure 2:
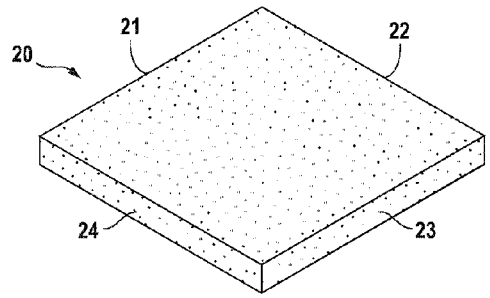
FIG. 2 is a perspective view of a planar base used as part of the substructure of the pet bed of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

In turning first to FIG. 1, cushion 10 is depicted. Cushion 10 is sized to be frictionally received in space 30 defined by sidewalls 31, 32, 33 and 34. As the sidewalls are substantially planar extending orthogonally from base 20, the pet bed takes on a tailored, finished appearance very much different from those unstructured "bean bag" type pet beds in common use today.

Figure 3:
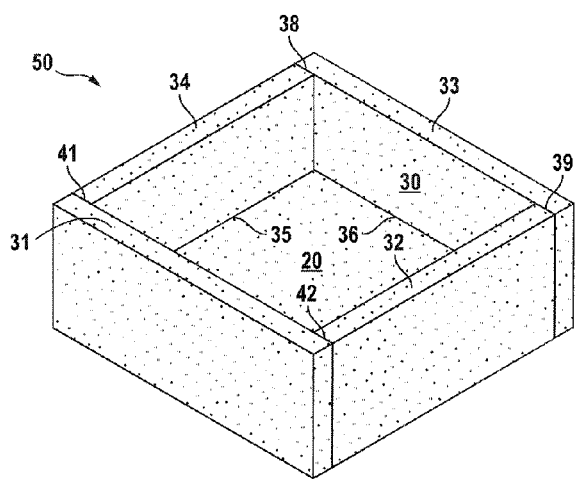
FIG. 3 is a perspective view of the planar base of FIG. 2 together with sidewalls appended thereto completing the substructure of the pet bed of the present invention.
Figure 4:
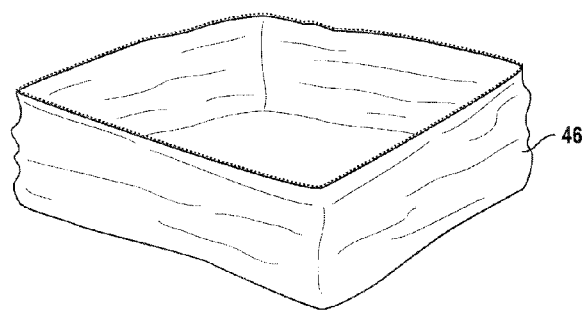
FIG. 4 is a perspective view of outer shell fabric material for use herein.

Pet bed 11 is composed of substructure 50 (FIG. 3). Substructure 50 comprises a square or rectangularly-shaped planar base 20 which acts as the cushioning or support beneath cushion 10 as will be more thoroughly described below. Planar base 20 is characterized as having a square or rectangular shape having edges 21, 22, 23 and 24. Substructure 50 further includes sidewalls 31, 32, 33 and 34 affixed to planar base 20 at its edges 21, 22, 23 and 24 by gluing at joinder edges 35 and 36 (as well as opposite edges not shown) such that square or rectangular sidewalls 31, 32, 33 and 34 extend orthogonally from planar base 20 creating volume 30 as shown in FIG. 3. Each of said square or rectangular sidewalls 31, 32, 33 and 34 is not only affixed to said planar base 20 at bottom edges thereof but are orthogonally affixed to adjacent sidewalls as shown. Ideally, planar base 20 and sidewalls 31, 32, 33 and 34 comprise low density polyurethane foam which is cut in slabs and which retain their shape throughout the life expectancy of pet bed 11. As will be noted in the fabrication process that will be later described, sidewalls 31, 32, 33 and 34 are to be covered with a shell material as constituting a further step in the construction of pet bed 11.

Cushion 10 is also of a generally rectangular construction and can be tufted by buttons 52 and 53 pulling surfaces 5 and 6 together by thread 4. Cushion 10 includes liner material 7 and fill material 47. Cushioning fill 47 can be any well-known polyester fiber such as that composed of synthetic fibers of recycled waste polyethylene terephthalate, from plastic bottle recycling.

Figure 7:
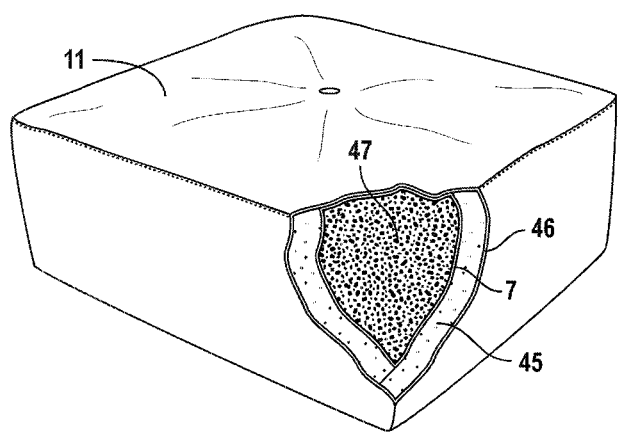
FIG. 7 is a perspective view of the present pet bed with a cutaway region to reveal its internal parts.

A design feature of the present invention is to size rectangular cushion 10 of substantially square rectangular geometry for a snug fit within volume 30 created by substructure 50 and be frictionally retained therein while employing a singular and continuous outer shell fabric sheet enclosing rectangular sidewalls 31, 32, 33 and 34 and creating the exterior of bed 11. In doing so, cushion 10 and volume 30 are sized such that substantially no deformation of sidewalls 31, 32, 33 and 34 occurs when said cushion is fitted within said volume. Thus, pet bed 11 will have a tailored, finished appearance (FIG. 7) in that low density polyurethane foam sidewalls 31, 32, 33 and 34 will maintain their shape throughout the useful life of pet bed 11 creating a substructure which is not only supportive of cushion 10 but provides its own degree of cushioning ensuring that a pet employing pet bed 11 would not be harmed when contacting substructure 50.

The fabrication of pet bed 11 is unique lending itself to certain economies which are not shared by pet beds of the prior art. In addition, the present fabrication technique fosters its tailored look which takes advantage of its foam sidewalls and rectangular construction.

Figure 5:
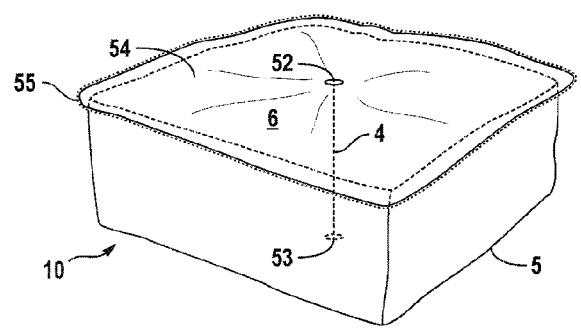
FIG. 5 is a perspective view of a cushion joined to a top cover constituting the support surface for a pet employing the present invention.

Square or rectangular cushion 10 having cushioning fill material 47 is generally provided with liner 7 for defining its shape and size. In fabrication, top cover 54 is applied to top surface 6 of cushion 10 and can be adhered thereto by passing thread 4 through cushion 10 as depicted in FIG. 5. Optionally, buttons 52 and 53 can be connected by said thread for creating a tufted look to the top of finished pet bed 11.

Figure 6:
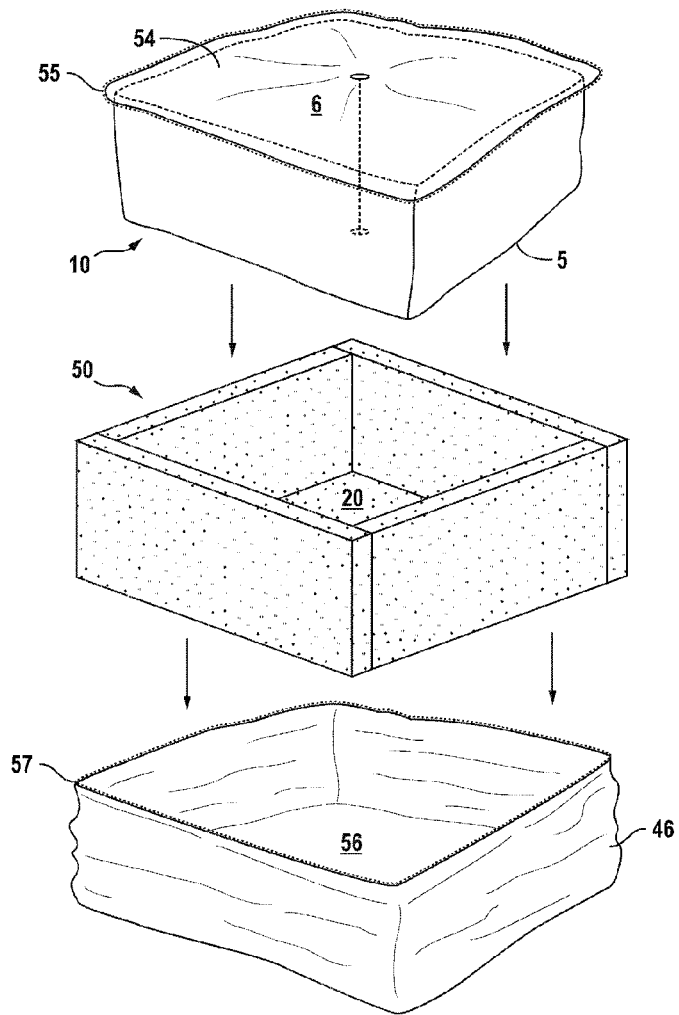
FIG. 6 is a perspective view of the present pet bed during its fabrication process.

In turning to FIG. 6, outer shell fabric 46, being of a square or rectangular geometry having bottom 56, is sized to receive substructure 50. Thereupon, cushion 10 including top cover 54 is fitted within volume 30 of substructure 50 noting that cushion 10 and internal volume 30 are shaped and sized to enable cushion 10 to snugly fit within this volume and be frictionally retained therein.

It is contemplated that top cover 50 be selectively joined to outer shell fabric 46 to enable cushion 10 to be selectively removed from pet bed 11 for cleaning and possible replacement. By way of illustration, zippered interface 55/57 facilitates such selective joinder. However, alternative ways of selectively joining top cover 54 to outer shell 46 can be employed as such alternatives would be well within the skill of the ordinary practitioner. Further, although FIG. 6 shows the ability to completely remove top cover 54 from outer shell fabric 46, an alternative would be to affix one edge of top cover 54 to outer shell fabric 46 such that a flap is created enabling the pet owner to simply peel back top cover 54, insert cushion 10 and connect the remaining three sides to complete pet bed 11.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A pet bed comprising:
   a substructure having a square or rectangular-shaped planar base and four sidewalls extending orthogonally therefrom, said sidewalls being affixed to said planar base proximate the edges of the planar base and to each other, said planar base and sidewalls comprising low density polyurethane foam and establishing a volume;
   a substantially square or rectangular cushion having a cushioning fill material within a liner defining the shape and size of the rectangular cushion;
   an outer shell fabric sized to extend over said planar base and side walls and further comprising a top cover selectively joined to said outer shell fabric for providing selective access to said volume;
   said cushion being shaped and sized for snugly fitting within said volume and being frictionally retained therein when said top cover provides for said selective access thereto;
   said top cover being affixed to said cushion; and
   said top cover being joined to said outer shell fabric after said rectangular cushion has been received within said inner volume.

2. The pet bed of claim 1, wherein said cushion and volume are sized such that substantially no deformation of said sidewalls occurs when said cushion is fitted within said volume.

3. The pet bed of claim 1, wherein said cushion comprises a top surface and an opposing bottom surface, said top surface being adhered to said bottom surface by a thread which passes through said top cover and cushion from said top surface to said bottom surface, said top and bottom surfaces being drawn together to create a tufted appearance.

4. The pet bed of claim 1, wherein each of said sidewalls is square or rectangular, a bottom edge of each of said sidewalls being affixed to said planar base and are affixed orthogonally to adjacent sidewalls.

* * * * *